United States Patent
Eskildsen et al.

(10) Patent No.: US 10,254,150 B2
(45) Date of Patent: Apr. 9, 2019

(54) SELF-CONTAINED, BUOYANT, AND WATER-TIGHT WIRELESS FLOOD DETECTOR

(71) Applicant: Honeywell International Inc., Morristown, NJ (US)

(72) Inventors: Kenneth G. Eskildsen, Great Neck, NY (US); Robert E. Lee, Garden City, NY (US); Kevin G. Piel, Ronkonkoma, NY (US)

(73) Assignee: ADEMCO INC., Golden Valley, MN (US)

( * ) Notice: Subject to any disclaimer, the term of this patent is extended or adjusted under 35 U.S.C. 154(b) by 266 days.

(21) Appl. No.: 15/399,998

(22) Filed: Jan. 6, 2017

(65) Prior Publication Data
US 2017/0115155 A1    Apr. 27, 2017

Related U.S. Application Data

(63) Continuation of application No. 13/913,934, filed on Jun. 10, 2013, now Pat. No. 9,582,987.

(51) Int. Cl.
| | |
|---|---|
| *G01F 23/00* | (2006.01) |
| *G01F 23/64* | (2006.01) |
| *G01F 23/76* | (2006.01) |
| *G08B 21/20* | (2006.01) |
| *G08B 25/10* | (2006.01) |
| *G08C 17/02* | (2006.01) |

(52) U.S. Cl.
CPC .......... *G01F 23/64* (2013.01); *G01F 23/0007* (2013.01); *G01F 23/0023* (2013.01); *G01F 23/76* (2013.01); *G08B 21/20* (2013.01); *G08B 25/10* (2013.01); *G08C 17/02* (2013.01); *G01F 23/0038* (2013.01)

(58) Field of Classification Search
CPC ...... G01F 23/76; G01F 1/005; G01F 23/0038; G01N 33/1886; G01N 33/18
See application file for complete search history.

(56) References Cited

U.S. PATENT DOCUMENTS

| | | | |
|---|---|---|---|
| 3,603,952 A | 9/1971 | Smith | |
| 3,719,936 A | 3/1973 | Daniels et al. | |
| 3,885,418 A | 3/1975 | Kriebel | |
| 4,116,045 A | 9/1978 | Potter | |
| 4,203,097 A * | 5/1980 | Manning | E04H 4/06 340/566 |

(Continued)

FOREIGN PATENT DOCUMENTS

CN    101774421 A    7/2010

OTHER PUBLICATIONS

Extended European Search Report, dated Oct. 30, 2014, corresponding to European Patent Application No. EP 14 16 9544.

(Continued)

*Primary Examiner* — David A Rogers
(74) *Attorney, Agent, or Firm* — Husch Blackwell LLP

(57) ABSTRACT

A floatable flood detector has a watertight housing that carries internally a wireless transmitter and a fluid sensor. In the presence of sensed fluid, an alarm message can be transmitted by the transmitter to a displaced monitoring unit. The sensor has a portion exposed to the fluid of interest outside of the housing. The antenna is carried, at least at a fluid level, relative to the floating housing.

14 Claims, 5 Drawing Sheets

(56) References Cited

U.S. PATENT DOCUMENTS

| | | | |
|---|---|---|---|
| 4,264,902 A | 4/1981 | Miller | |
| 4,325,060 A * | 4/1982 | Purtell | G08B 21/20 310/323.06 |
| 4,631,956 A | 12/1986 | Walden et al. | |
| 4,644,328 A | 2/1987 | Szymansky et al. | |
| 4,771,272 A | 9/1988 | Barnes | |
| 4,778,957 A | 10/1988 | Crowell | |
| 4,973,947 A | 11/1990 | Tax | |
| 5,091,715 A * | 2/1992 | Murphy | G01F 23/242 200/61.05 |
| 5,152,610 A * | 10/1992 | Hallett | E04H 4/14 374/141 |
| 5,169,236 A * | 12/1992 | Iest | G01K 1/045 374/142 |
| D360,153 S * | 7/1995 | Chacchia | D10/101 |
| 5,517,202 A * | 5/1996 | Patel | H01Q 1/34 340/984 |
| 5,532,679 A | 7/1996 | Baxter, Jr. | |
| 5,621,390 A | 4/1997 | Neal | |
| 5,654,692 A | 8/1997 | Baxter, Jr. et al. | |
| 5,767,775 A | 6/1998 | Shukla et al. | |
| 6,008,728 A | 12/1999 | Wesey | |
| 6,025,788 A | 2/2000 | Diduck | |
| 6,113,858 A * | 9/2000 | Tang | G01N 21/78 422/66 |
| 6,225,900 B1 * | 5/2001 | Keon | G08B 1/08 340/384.1 |
| 6,238,553 B1 * | 5/2001 | Lin | C02F 1/008 204/412 |
| 6,309,538 B1 * | 10/2001 | Khan | C02F 1/008 210/143 |
| 6,340,431 B2 * | 1/2002 | Khan | C02F 1/008 210/138 |
| 6,583,724 B1 | 6/2003 | Rodriguez | |
| 6,711,949 B1 | 3/2004 | Sorenson | |
| 6,910,498 B2 | 6/2005 | Cazden | |
| 6,958,693 B2 * | 10/2005 | Rothgeb | A47L 15/4297 134/113 |
| D526,382 S * | 8/2006 | Thompson | D23/208 |
| 7,409,853 B2 * | 8/2008 | Biberger | G01N 33/1886 210/96.1 |
| 7,471,206 B1 | 12/2008 | Ellerman | |
| 8,305,226 B2 * | 11/2012 | Ho | A01K 7/06 340/549 |
| 8,459,100 B2 * | 6/2013 | Biberger | G01N 33/18 210/85 |
| 8,508,382 B1 | 8/2013 | Novak | |
| 9,582,987 B2 * | 2/2017 | Eskildsen | G01F 23/64 |
| 9,640,058 B1 * | 5/2017 | Bollman | G08B 21/084 |
| 2001/0045380 A1 * | 11/2001 | Khan | C02F 1/008 210/85 |
| 2003/0068936 A1 | 4/2003 | Yerazunis et al. | |
| 2003/0227394 A1 | 12/2003 | Rothgeb et al. | |
| 2004/0004545 A1 | 1/2004 | Early | |
| 2004/0004550 A1 | 1/2004 | Early | |
| 2004/0004551 A1 | 1/2004 | Early | |
| 2004/0031329 A1 * | 2/2004 | Carpenter | G01F 23/26 73/861.19 |
| 2004/0056779 A1 | 3/2004 | Rast | |
| 2005/0084418 A1 | 4/2005 | Hill et al. | |
| 2005/0220169 A1 * | 10/2005 | McGowan-Scanlon | G01K 1/14 374/156 |
| 2005/0279677 A1 * | 12/2005 | Lin | C02F 1/688 210/96.1 |
| 2006/0292043 A1 | 12/2006 | Biberger | |
| 2008/0087209 A1 | 4/2008 | Yoshida et al. | |
| 2008/0150733 A1 | 6/2008 | Snyder et al. | |
| 2009/0107386 A1 | 4/2009 | Sampson et al. | |
| 2009/0224930 A1 | 9/2009 | Burza | |
| 2009/0295566 A1 | 12/2009 | Weintraub | |
| 2011/0012728 A1 | 1/2011 | McCane et al. | |
| 2011/0073707 A1 | 3/2011 | Bossert et al. | |
| 2011/0108370 A1 | 5/2011 | Therriault | |
| 2011/0155546 A1 | 6/2011 | Ford | |
| 2012/0275265 A1 | 11/2012 | Nielsen et al. | |
| 2014/0266745 A1 | 9/2014 | Middleton | |
| 2014/0361887 A1 | 12/2014 | Eskildsen et al. | |
| 2016/0348502 A1 * | 12/2016 | Kim | G08C 17/00 |

OTHER PUBLICATIONS

State Intellectual Property Office, P.R. China's First Office Action with Search Report, dated Feb. 2, 2016, corresponding to Chinese Patent Application No. 201410317170.2.

English-language translation of State Intellectual Property Office, P.R. China's First Office Action with Search Report, dated Feb. 2, 2016, corresponding to Chinese Patent Application No. 201410317170.2.

English-language translation of abstract of CN101774421 (A), obtained Jun. 14, 2016.

* cited by examiner

SELF-CONTAINED, BUOYANT, AND WATER-TIGHT WIRELESS FLOOD DETECTOR

CROSS-REFERENCE TO RELATED APPLICATIONS

This application is a continuation of and claims the benefit of the filing date of U.S. application Ser. No. 13/913,934 filed Jun. 10, 2013.

FIELD

The application pertains to fluid detectors to provide indicators of flooding in regions of interest. More particularly, the application pertains to such detectors that are self-contained and can wirelessly communicate with systems monitoring various conditions in a region of interest.

BACKGROUND

Systems are known to monitor regions of interest for the presence of various predetermined conditions. These include intrusion, glass breakage, smoke, fire, humidity, and temperature, all without limitation. At times, it is desirable to monitor a region for the presence of fluids, for example, flood water.

Known types of flood detectors have one or two part designs. The one part designs are not buoyant and are designed to be submersible should the flood water rise higher than the sensor. As a result, such products are usually not wireless since the wireless performance would be quite poor when submerged.

An exemplary two part product that exists in the wireless market place includes a probe and a separate transmitter with a wire between the probe and the transmitter. Installation of this type of product involves attaching the probe with screws in the area to be monitored. Then, the transmitter is mounted a distance away from the probe, and a wire is routed between the probe and transmitter. The transmitter is mounted away from the probe to protect it from the water and ensure that the probe does not become submerged, rendering it inoperable.

The above process is time consuming. It may take as much time as an installer may have for installation of an entire monitoring system. Further, this type of product is not something that can be mailed to a home owner for self-installation.

It would be desirable to have available a wireless flood detector that can be easily installed without a need for special installation skills or instructions.

DETAILED DESCRIPTION

Figure 1:
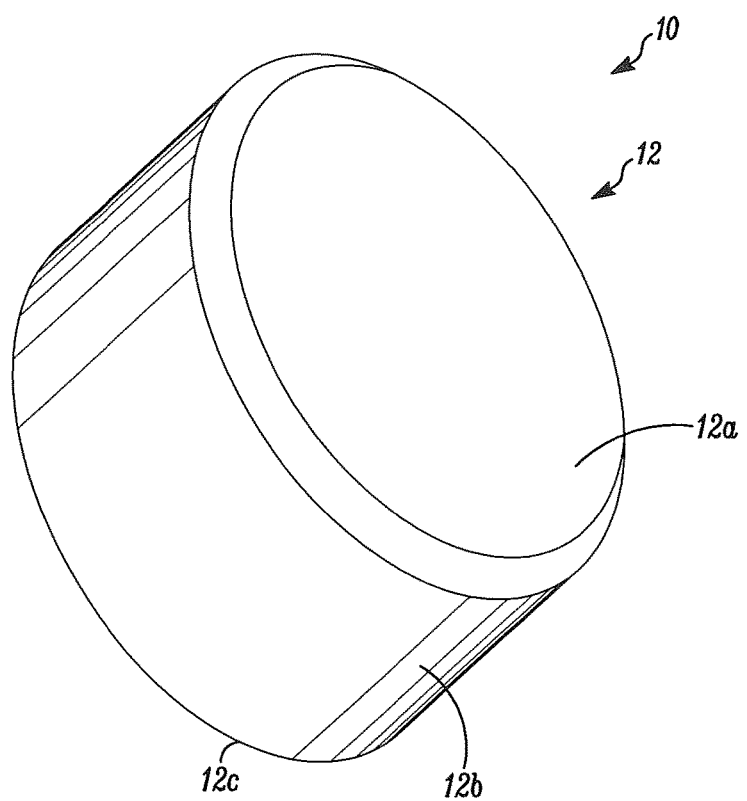
FIG. 1 illustrates a flood detector in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In a disclosed embodiment, a wireless flood detector is configured with a single housing. The fluid or flood probes or electrodes are molded into the housing on the top, the bottom, or both. The detector is buoyant so as to keep the electronics (radio, antenna, etc.) above water and operational. Installation is as easy as placing it in the area to monitor for flooding. Advantageously, in the disclosed detector, the sensor, radio, and flood probes are mounted in a single, watertight, buoyant housing.

The housing is preferably made of a buoyant material, for example, plastic with an air pocket foam). Molded into this housing are two fluid sensing electrodes on one or both sides that could contact the area to be monitored.

The preferred embodiment has a puck-like shape. Two electrodes can be located on the top of the puck, and two electrodes can be located on the bottom of the puck. It will be understood that other housing shapes come within the spirit and scope hereof. For example, a spherical housing could be used.

Inside the puck resides control circuits and a wireless transmitter. In one embodiment, a Honeywell model 5816 transmitter could be used. The control circuits can be connected to the electrodes. An antenna, coupled to the transmitter, is mounted in the center of the puck such that it will be above water regardless of the orientation of the puck relative to the fluid, such as water.

When the electrodes on either side of the puck are submerged in water, the presence of the water can be detected. A message can be wirelessly transmitted to a displaced control panel.

To install such detectors, an installer would first enroll the flood puck's serial number into the control panel by either submerging the detector in water or by shorting the two electrodes with a wire or screwdriver. Once enrolled, the installer would identify an area for flood monitoring and place the flood puck in that area. When there is a flood, the electrodes will be submerged in the water and send an alarm indicating signal to the control panel. Should the water rise, the flood puck will float on the water, keeping the electronics dry and the antenna above the water, ensuring continued operation.

The figures illustrate various aspects of embodiments hereof. A fluid detector 10 includes a cylindrical, puck-shaped housing 12 having an upper surface 12a, a closed bounding sidewall 12b, and a lower surface 12c. The housing 12 is closed and watertight.

Figure 3:
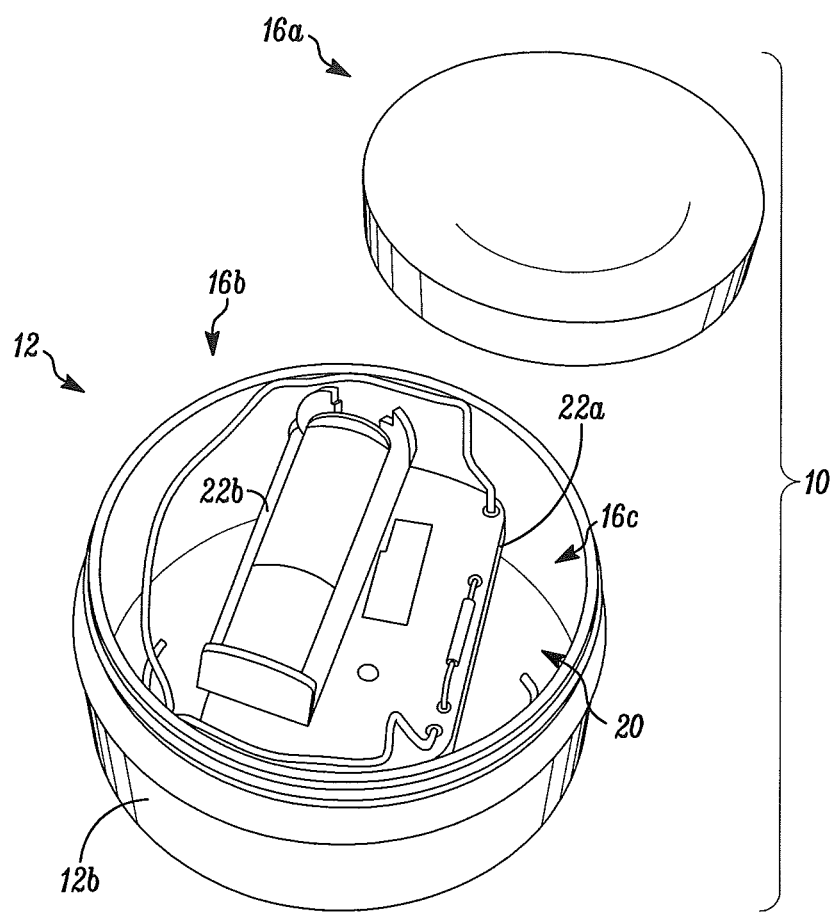
FIG. 3 is an over-all view of the detector of FIG. 1 with the cover removed.

As illustrated in FIG. 3, the housing 12 includes a removable cover 16a and a base portion 16b, which defines an interior region 16c. When the cover 16a is removably attached to the base 16b, for example, by threads or a snap fit, a closed dry interior region is formed, which includes the interior region 16c. It will be understood that other shapes of a housing could be used as well as other structures to attach the cover 16a to the base 16b without departing from the spirit and scope hereof.

Figure 4:
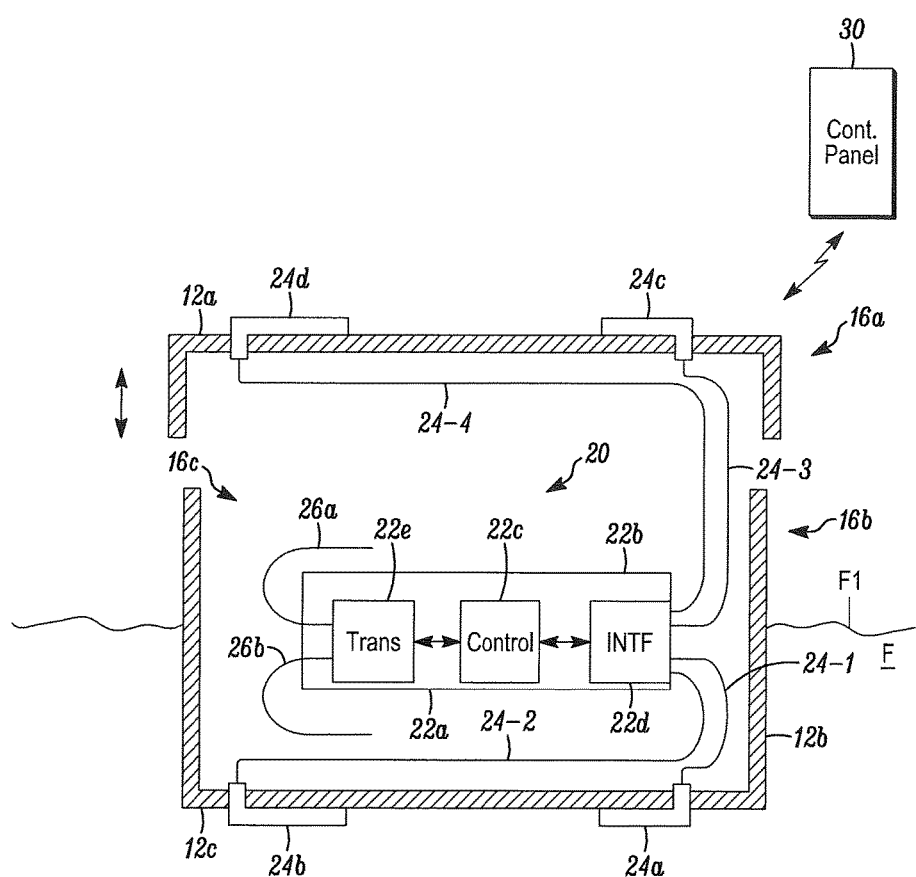
FIG. 4 is a side sectional view of a detector as in FIG. 1 and FIG. 3.

The housing 12 can carry an electronics package 20, which includes a printed circuit board 22a. The board 22a supports a replaceable battery 22b, which provides electrical energy for control circuits 22c, sensor interface circuits 22d, and a transmitter or a transceiver 22e, best seen in FIG. 4.

Figure 2:
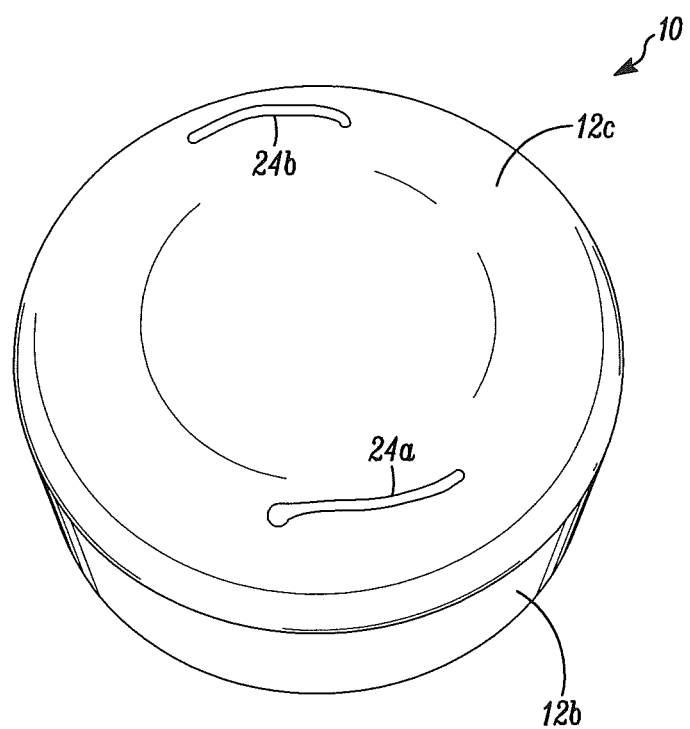
FIG. 2 is a bottom view of the detector of FIG. 1.

Electrodes or sensors 24a, b can be carried on a surface 12c outside of the housing 12 for exposure to local fluids F, as illustrated in FIG. 2. The electrodes 24a,b could be molded into the lower portion 16b of the housing 12 and connected to the sensor interface circuitry 22d in the region 16c via sealed, fluid excluding ports in the surface 12c and conductors 24-1, -2.

A second set of electrodes 24c, d can be formed in an upper surface 12a of the housing 12, also coupled to the sensor circuits 22d by conductors 24-3, -4. Those of skill will understand that neither the exact type of fluid sensors used nor the structure of the conductors to the interface circuits 22d represent limitations hereof.

First and second antenna sections 26a, b are carried on/by the printed circuit board 22a and are coupled to the transceiver 22e. The antennas 26a,b are configured such that one of them is always above a fluid level surface F1 when the detector 10 is floating in the fluid F to facilitate wireless communications with a displaced monitoring control unit or panel 30.

Figure 5:
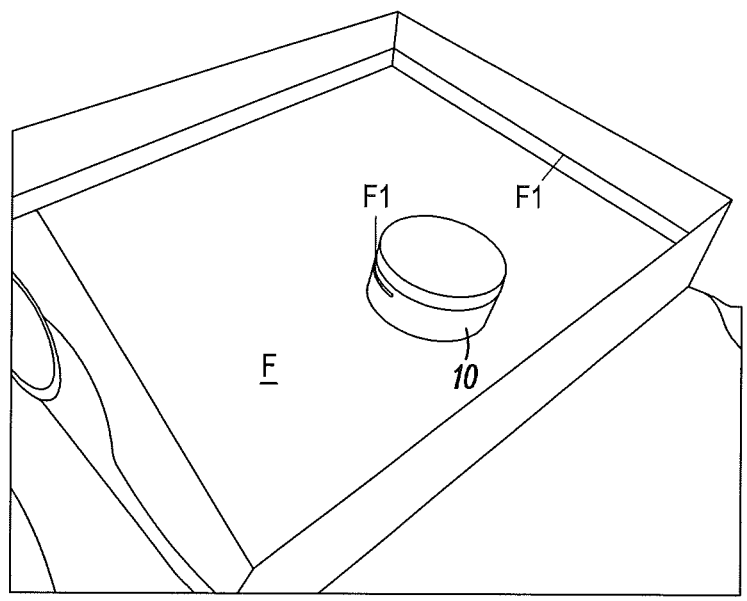
FIG. 5 illustrates the detector hereof floating in a fluid.

FIG. 5 illustrates the detector 10 floating in a fluid F. Advantageously, when both surfaces 12a and 12c carry fluid sensors, such as 24a . . . c, the orientation of the detector 10 in the fluid F is irrelevant given the above-noted antenna configuration. Hence, the installer merely needs to place the detector 10 into the region where the fluid might collect without being concerned as to its orientation.

In summary, a flood detector includes a floatable, self-contained housing that carries external fluid sensors. Control circuitry, coupled to the sensors, and a transmitter can be carried in the housing. The detector can communicate wirelessly with a displaced monitoring system control unit or panel.

An antenna is carried in the housing, coupled to the transmitter. When the housing floats in the fluid, a portion of the housing is below the upper surface of the fluid, and a portion is above that upper surface. The housing is configured such that the antenna is above the upper surface of the fluid to improve wireless communications with the displaced control panel while the detector is floating in the fluid.

Further, it will be understood that the type of fluid being sensed is not a limitation hereof. The relative location of the antenna to the surface of the fluid is preferably at the top of the fluid to minimize RF attenuation. Finally, the housing needs only to be fluid resistant long enough to send a transmission indicating that fluid has been sensed.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
    a housing;
    a plurality of fluid sensors carried on an external surface of the housing;
    an electronics package carried within an interior region of the housing and coupled to the plurality of fluid sensors; and
    at least one antenna carried by the electronics package within the interior region of the housing,
    wherein, when the housing and at least one of the plurality of fluid sensors are located in and exposed to an ambient fluid, the electronics package detects a presence of the ambient fluid regardless of an orientation of the housing and the plurality of fluid sensors relative to the ambient fluid, and
    wherein, when the housing and the at least one of the plurality of fluid sensors are located in and exposed to the ambient fluid, the at least one antenna is above an upper surface level of the ambient fluid regardless of the orientation of the housing relative to the ambient fluid, thereby facilitating wireless communications with a displaced monitoring control unit.

2. The system of claim 1 wherein the housing is buoyant.

3. The system of claim 1 wherein the housing is watertight.

4. The system of claim 1 wherein the housing has a puck-like or spherical shape.

5. The system of claim 1 wherein the plurality of fluid sensors includes electrodes.

6. The system of claim 5 wherein the electrodes are molded into the housing and exposed to an external environment of the housing.

7. The system of claim 5 wherein a first of the electrodes is carried on a first side of the external surface of the housing, and wherein a second of the electrodes is carried on a second, opposite side of the external surface of the housing.

8. The system of claim 1 wherein the electronics package includes circuitry and a wireless transmitter, wherein the circuitry is coupled to the plurality of fluid sensors, and wherein the wireless transmitter is coupled to the at least one antenna.

9. The system of claim 8 wherein the electronics package includes a replaceable battery that provides electrical energy to the circuitry and the wireless transmitter.

10. The system of claim 1 wherein the at least one antenna is mounted in a center of the interior region of the housing.

11. The system of claim 1 wherein, when the housing and the at least one of the plurality of fluid sensors are located in and exposed to the ambient fluid, a first portion of the housing is below the upper surface level of the ambient fluid and a second portion of the housing is above the upper surface level of the ambient fluid.

12. The system of claim 1 wherein, when the housing and the at least one of the plurality of fluid sensors are located in and exposed to the ambient fluid, the at least one of the plurality of fluid sensors is at or below the upper surface level of the ambient fluid and a second of the plurality of fluid sensors is above the upper surface level of the ambient fluid.

13. The system of claim 1 wherein, when the housing and the at least one of the plurality of fluid sensors are located in and exposed to the ambient fluid, the housing floats on the upper surface level of the ambient fluid.

14. The system of claim 1 further comprising two antennas carried by the electronics package, wherein, when the housing and the at least one of the plurality of fluid sensors are located in and exposed to the ambient fluid, a first of the two antennas is above the upper surface level of the ambient fluid and a second of the two antennas is below the upper surface level of the ambient fluid.

* * * * *